May 12, 1970        R. J. DE HAECK        3,511,960
ELECTRIC ARC WELDING
Original Filed June 30, 1969        4 Sheets-Sheet 1
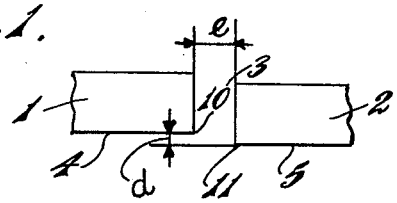
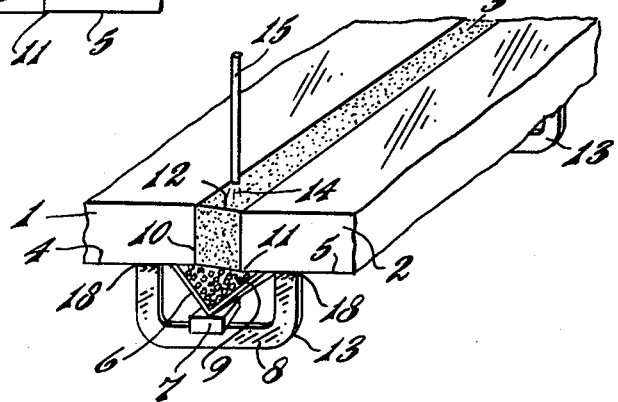
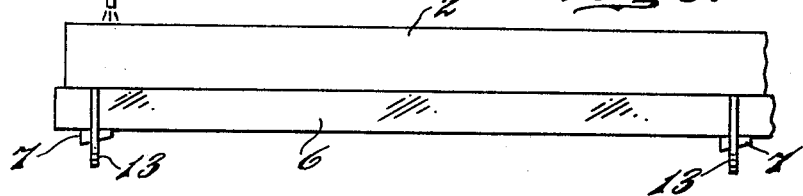
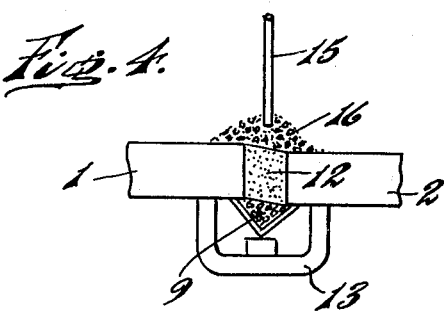
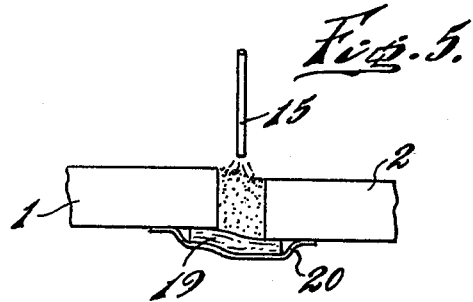
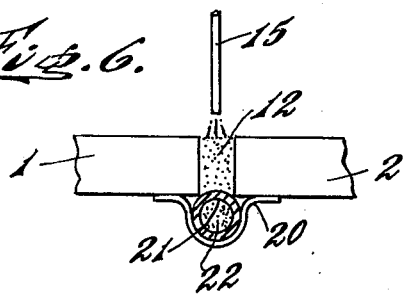
INVENTOR.
Robert Jean De Haeck
BY
ATTORNEYS INVENTOR.
Robert Jean De Haeck
BY
ATTORNEYS INVENTOR.
Robert Jean De Haeck
BY
ATTORNEYS May 12, 1970   R. J. DE HAECK   3,511,960
ELECTRIC ARC WELDING
Original Filed June 30, 1969   4 Sheets-Sheet 4

INVENTOR.
Robert Jean De Haeck
BY
ATTORNEYS

United States Patent Office 3,511,960
Patented May 12, 1970

---

3,511,960
ELECTRIC ARC WELDING
Robert Jean De Haeck, Uccle, Brussels, Belgium, assignor to La Soudure Electrique Aulogene Procedes Arcos, Brussels, Belgium, a corporation of Belgium
Original application June 30, 1969, Ser. No. 837,771. Divided and this application Jan. 31, 1967, Ser. No. 612,864
Claims priority, application Belgium, Feb. 11, 1966, 23,971; Sept. 8, 1966, 33,086; Dec. 16, 1966, 37,319
Int. Cl. B23k 9/18
U.S. Cl. 219—73                    7 Claims

---

ABSTRACT OF THE DISCLOSURE

The invention relates to electric arc welding between two metallic plates, at least one of which is horizontal, placed in spaced relation to form a welding groove. The bottom of the groove is closed by material refractory to the molten metal, which may be loose granular material or a fiberous cushion of felt-like character. The welding groove is filled with essentially metallic particles and an arc is struck between a fusible metallic electrode introduced from above and the metallic particles. The refractory material in the preferred form does not generate gases in contact with the molten metal pool, has a melting point ranging between 1350 and 1450 deg. C., has a coefficient of expansion from heat ranging between $30 \times 10^{-6}$ and $50 \times 10^{-6}$ per deg. C. as computed from International Critical Tables and has a thermal conductivity ranging between $10 \times 10^{-4}$ and $40 \times 10^{-4}$ cal. cm.$^{-1}$ sec.$^{-1}$ deg. C.$^{-1}$. In a preferred form the refractory material is resiliently urged against the bottom of the weld groove as by a pneumatic tire or springs.

---

This application is being divided and the subject matter relating to the apparatus is being embodied in a divisional application, Ser. No. 837,771, filed June 30, 1969, for Electric Arc Welding Apparatus.

DESCRIPTION OF THE INVENTION

The present invention concerns electric arc welding of joints between metallic plates, one of which at least, is laid down.

Plates used in shipbuilding are delivered directly from the steel mills. Their edges are irregular, with jagged seams or covered with oxides. To weld them correctly requires observance of a list of prior conditions. First the edges must become perfectly straight. They are therefore cut correctly before being abutted. Knowing the number of plates needed to be welded to make a ship, and that each plate must be cut on four sides, one can get an idea of the amount of waste resulting from trimming. But there is more: the edges of the plates must be set to avoid any offset between them. They must be level to each other. This requires preliminary positioning which takes a long time.

The complication is still worsened by the fact that when weld metal has been deposited on one side of the joint, the plates must be turned over to deposit weld metal on the reverse side of the joint. This operation is time consuming, difficult and costly because of loss of time. Furthermore it requires capital investment in machinery such as cranes and other materials handling equipment and also suitable buildings. Due to the great dimensions of the plates being welded—and this is particularly true for ship plates—the sizes of the workships become insufficient.

It becomes clear from these facts how advantageous it would be in shipbuilding, to select a welding process which would eliminate all these difficulties. A desirable feature would be to weld the plates without having first to set their edges, and also to weld the plates on one face only.

In addition to the preceding, the following considerations must be taken into account:

In the technique of shipbuilding, the plate thickness and the weld deposition rate are essential factors. This will explain how important it will be to use any welding process using higher and higher currents to increase the deposition rate. Precisely because of the great energy developed in the arc of well-known automatic or semi-automatic processes of submerged arc welding, or with flux-cored wires, the latter processes are much in demand in shipbuilding.

When the current increases, the power developed in the arc becomes enormous, and this means also deep penetration in the base metal. To obtain practical success in an automatic welding process of this kind, two groups of factors must be properly determined: the welding parameters which a workman of average intelligence can select, and the preparation and setting of the edges.

It is easy to obtain under laboratory conditions a perfect joint by the submerged arc welding process in plates ¼", ⅜", ¾" and 1¼" thick and more, which have been prepared with I, Y or X edges, using the parameters found in most welding handbooks. The plates are placed very closely side by side, with some tolerance of the gap between them. Certainly, when the plates have been well sheared, the high current welding process is satisfactory. But when gaps between edges to be welded reach 5/32", the arc and the weld pool may pass through. It is in such case that human control becomes essential because the operator using a manual electrode of the heavy deposition type will immediately adjust his parameters to suit the variations of spacing between the edges. It is for that reason that the preparations mentioned hereabove are often replaced by an incomplete V chamfer with narrow straight faces at the bottom. One or more passes are hand welded at the bottom of the chamfer. The joint is then completed with more layers deposited in succession one side and the other of these first manually-welded passes.

In final analysis, the use of a high speed and fully automatic welding process is limited by the practical difficulty of correct pre-assembling which would be compatible with the welding parameters selected in the laboratory in close relationship to the gap between the edges.

If, however, in spite of these difficulties, high current automatic welding processes must be used, an improvement can be obtained by increasing the number of passes and reducing the current in the first pass. However, there will still be differences in penetration which no longer can be corrected by the operator because in such case observation and control of the weld pool are missing and therefore the joints will be of variable quality from the standpoint of interpenetration. Furthermore, the cost of the welding operation will be increased.

To remedy the difficulties of the above-mentioned processes, a cooled or an uncooled metallic back strip, or a refractory one, have been proposed, such back strip being either powdery or compact. In some cases both forms have been combined. However, such methods are not used practically for the following reasons: a thick copper strip such as proposed in Robbins U.S. Pat. 3,253,121 to prevent leakage of molten metal from the pool is objectionable because of its tendency to cool the weld metal, creating harmful residual stresses in the structure. Furthermore, if the plates being welded are not perfectly plane, and this is often the case in practice, it is extremely difficult to hold the metallic back strip sufficiently close to the surface of the plates to prevent leakage of weld metal between the backstrip and the rear face of the plates being welded. In such case, a spacing between the strip and the plate of .020" is the permissible maximum.

Even if it were possible, with considerable care, to reduce greatly the tolerance of level inequality between the plates, variations in the gap between the plates which are unavoidable in modern methods of cutting, would still exist. The defects caused by such differences in the gap width are the following:

In the high speed welding process, the welding parameters are related to high currents. The electric power in the arc is great. When the edges are sufficiently close together this high energy of the arc can be distributed correctly and deeper portions in the joint also become fused, giving a smooth joint on the rear face, but in so doing the penetration effect of the arc extends toward the rear copper backing strip due to the very power of the arc. If the edges of the plates are somewhat wider apart, the penetration effect of the arc results in a local fusion of the copper strip, rapidly followed by a local cooling, resulting in a heavy contamination of the rear face of the weld. The harmful effect of copper in steel, from the backing strip, is well-known in welding practice from the cracking it causes in the joint. On the other hand, if the distance between the edges of the plates is too small, the deeper portions of the joint will be incompletely fused.

It is therefore clear that the setting of the edges at the correct distance from each other is a delicate operation which is akin to precision work with all the consequences it entails in technique, where such requirement becomes a grave drawback.

The harmful effect of the copper can be eliminated by using granular refractory supporting materials. Such solution has been proposed already by investigators.

Instead of the copper strip covering the rear face of the joint, some trough, for instance, filled with a free-moving granular refractory material bridges the rear face of the joint. In most variations of this concept, the refractory powder is subjected to some pressure against the rear face of the parts being welded, in order, allegedly, to give the rear face of the weld a suitable profile. In one of the variants, in particular, a pneumatic sleeve or tire is placed in the bottom of the trough and a free metallic strip is located between the sleeve and the powder filling the trough, to distribute the pressure of the refractory material.

In most cases, this pressure is necessary because the granular refractory material used is the same as ordinary flux and is not especially intended to act as a support. The pressure so applied corrects the effects of a bad selection of the granular refractory material. Excessive pressure must be avoided because the powder would enter into the joint. But on the other hand, insufficient pressure would not suffice to contain the molten weld metal.

The problem of holding the support to apply adequate pressure against the joint was tentatively solved by feeding the powder progressively and intermittently longitudinally under the joint. But these methods are not satisfactory when the edges of the plates are variably spaced or offset to such extent as that they exceed normal tolerances in preparation and setting of the butt joints of the plates.

It would not be possible at any rate to weld plates of 3/8", 3/4", 1 1/4" and 1 1/2" thick or more, in a satisfactory manner, on one side only, in one or two passes, should the gap between the edges vary from 0 to 1/4", for instance, by a high speed modern automatic welding process such as the conventional submerged arc welding method, or when using flux-cored wires with currents much higher than 400 amps, by simply placing on the back face of the joint granules of a suitable refractory material.

In locations where the edges of the plates are spaced too much, the void of the gap exerts no restraint on the arc jet and the arc can now blow the refractory material off, with the result that the profile of the weld on the back side is no longer smooth or correct. From what has been said hereabove, the limits which cannot be exceeded in welding abutted plates are such that the gap between the edges must be no larger than 1.5 mm. (1/16") for instance, regardless of whether the edges of the plates are chamfered or not.

However, welding plates having edges summarily prepared or even not prepared at all, and set up summarily, has been made possible. In known processes so qualifying, either metallic particles or electrically conductive granules are used as welding material, being laid in the joint to be welded. The metallic powders used are a mixture of commercial iron powder, ferromanganese, other alloys and deoxidizers. However, the use of such powders having a composition similar to that of low carbon steel, although slightly altered by addition of deoxidizers, in view of loss of the manganese, cannot solve the technical problem of welding poorly-fitted plates on one face only.

The metallic particles absorb the impact of arc penetration and its heating effect, but, when there is no suitable support, as always in these processes (a copper support being out of the question), and level deficiencies reach 3/16", welding on one side only is impossible. In fact, metallic particles permit welding at high speed two plates summarily set horizontally, but it is necessary to turn the plates upside-down for a second pass on the rear face of the joint.

There is still another process known for welding two plates on one face only. In this process, the filler wire is laid in the gap between the edges of the plates being welded and a support consisting of a trough containing the refractory powder is pressed on the back side of the joint. The idea is to protect the joint from the blast and impact of the arc, using the wire as a screen while in the previously cited process the metallic powder was fulfilling this function. But this process does not permit welding with gaps and offsets between the edges of the plates as large as are found in practice.

The process as per the invention remedies all the difficulties of the various processes used so far where welding horizontal plates is concerned, while retaining all their advantages.

A first advantage is to permit welding of the plates in a single operation without material handling and to obtain on both faces of the joint of a weld bead particularly sound, good-looking and free of porosity or inclusions, with full interpenetration into the base metal and perfect binding to the latter, and with the correct reinforcement (1/10 of the plate thickness).

Another advantage is to permit welding plates whose edges are far apart.

Another advantage is welding, in such cases, of plates showing a pronounced or variable offset in level, up to 3/8" or more, while maintaining the upper faces of the plates at the same level. Another advantage is to permit welding upward on an incline of about 10% on plates which can be plane or curved, concave or convex.

Another advantage is to permit welding in a single pass, without preparation, of plates still untrimmed, which require no shearing, clearing of edge defects or removal of oxides, and where the difference in thickness of the adjoining plates can reach 3/4".

Another advantage is to permit welding in a single pass of plates joining at an angle to each other.

Another advantage consists in reducing the penetration into the base metal and, consequently the reduction of dilution of the weld metal by the base metal, thus reducing the danger of weakening of metallurgical and mechanical properties of the welds.

Still another advantage is reduction of distortions.

Another advantage is obtaining a chemical composition for the weld nearer the composition of the weld metal or the desired composition.

Another advantage is in obtaining better impact strength because of smaller amounts in C, S and P being absorbed.

Another advantage is to permit the use of much larger welding parameters.

Still another advantage consists in an increase in productivity and efficiency in welding.

Another advantage is to permit welding high yield steel plates, for instance the 52 type, corresponding to the E. H. class fulfilling the requirements of quality control organizations such as the Lloyds Register of Shipping.

The invention consists in an electric arc welding process in one or more passes on the same face of two metallic plates, at least one of them laid down, characterized by a combination of the following means:

(a) support consisting in a material which is refractory to molten metal, freely applied and without any pressure upon the back face of the gap separating the edges of the plates being welded.

(b) essentially metallic powders introduced in a known manner in said gap.

(c) an arc striking between a fusible electrode and the said powder of essentially metallic nature, and the arc moving along said gap on one side only of said gap.

By horizontally laid plates should also be understood plates inclined at an angle of 30° in relation to the horizontal.

The figures shown as part of this specification permit realizing more precisely the scope and advantages of the invention.

FIG. 1 is a schematic view of the faces of the edges of the plates at a distance $e$ from one another with a level difference $d$ from one another.

FIG. 2 shows in perspective an example of a device used to apply the plate welding process as per the invention.

FIG. 3 is a side view of the device shown in FIG. 2.

FIG. 4 is a front view of the device of FIG. 2 to apply the plate welding process as per the invention.

FIGS. 5 and 6 are schematic front views of the device used to apply the plate welding process of the invention in two other applications.

Figure 7:
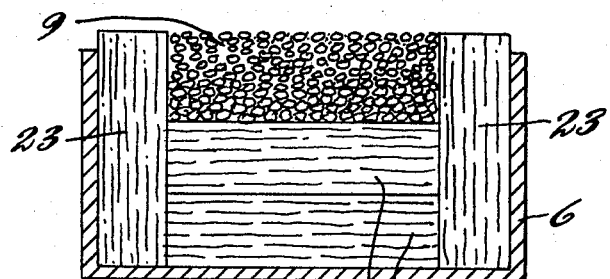
FIG. 7 is a cross section in a U-shaped trough ready to be pressed against horizontal plates to be welded.

In these figures, like references pertain to like means or parts of means used.

In the form of execution of the process of the invention, shown in FIGS. 1, 2, 3 and 4, the plates 1 and 2 are at different levels. A trough 6 is applied against the plates and is held by wedges 7, or more advantageously by elastic means such as springs or rubber belts or pneumatic sleeves or tires placed between the lower portion of the trough and the cross members 8 of yokes or horseshoes 13 which straddle the weld groove or joint on its back face and which are temporarily attached to it, either magnetically, or by tack welds 18.

The pressure of the wedges is sufficient for the support to adapt perfectly to all unevenness of the plates.

The trough is filled with refractory granules or powder 9 up to the faces 4 and 5 of the plates along a plane joining the lower border lines 10 and 11 of the edges of the plates, pouring the powder through the gap separating the edges of the plates being welded. Subsequently, a mixture 12 of metallic powder, the composition of which is given in another connection, is poured into the weld groove or gap 3 separating the edges of the plates, later striking an electric arc 14 between the electrode 15 and the metallic powder 12.

The function of the trough is passive, i.e. it is simply laid against the back side of the plates with no pressure against the back side of the plates with no pressure against the refractory powder. Its only purpose is to support the refractory powder and to follow closely the irregular profile of the back of the joint. It can be shaped as an L or a U or a semi-circle or semi-ellipse or in any shape whatever suitable to be applied against the back face of the joint.

The electric arc moves along the joint on one side of it. In the device shown in FIG. 4 the metallic powder is covered with flux 16 of a grade available in the trade and the arc striking between the electrode and the metallic powder is therefore submerged.

Instead of using a submerged arc striking from a bare wire, one can use a flux-cored wire containing slag-forming materials, protecting the arc by a suitable gas. A bare wire could also be used as electrode under gas protection. Finally, the electrode could be a manually operated welding rod.

In the case where, due to the use of high welding currents, the outside diameter of the electrode would exceed the distance between the edges being welded, the crossection of the electrode used should be, for example, rectangular with the small side shorter than the distance or gap of the joint being welded, while the long side would be parallel to the joint or weld groove.

In another example of the process as per the invention, shown in FIG. 5, the refractory material in the support consists in woven refractory fibers having a chemical composition close to that of the refractory powder used in the process as per the invention, and the support takes the shape of a thick elastic strip 19 having the consistency of felt, held in position by an adhesive strip 20 which can be stuck under and adhering to the contour of the back face of the joint.

Instead of being flat, the support could be shaped as a tube 21 in FIG. 6, filled with refractory powder 22 of chemical composition close to that of the refractory powder of the invention, and applied on the back side of the joint by an adhesive strip 20.

One of the ways by which the best results can be obtained consists in selecting suitable physico-chemical properties for the refractory material used as a support, and studying and adapting them toward suppressing possible difficulties still traceable to the use of a refractory material selected without further concern in this respect. Independently from the fact that the refractory material must have been pre-fused and must be non-hygroscopic and develop no gas during the welding operation, it was found that the chemical composition of the said material which gives the best results belongs to the following systems:

$Al_2O_3$—$R_2O$, RO, $RO_2$ with $R_2O$:$Na_2O$ and/or $K_2O$
CaO—$R_2O$, RO, $RO_2$, RO:CaO and/or MgO, FeO, MnO
MgO—$R_2O$, RO, $RO_2$ $RO_2$:$SiO_2$ and/or $TiO_2$, $ZrO_2$ $CaF_2$ may be present in the proportion of about 10%.

Furthermore, the raw materials have a melting point between 1300 deg. C. and 1850 deg. C., i.e. differing from the melting point of the metal such as steel or a heat or corrosion resisting alloy by no more than 300 deg. C. over or under. Because the melting temperature is established within definite limits, a small but sufficient portion of the material becomes viscous and properly supports the molten metal pool during the welding operation. It is found that the thickness of slag so created is in the range of 1 to 4 mm.

However, experience has shown that certain substances, such as silica, having a melting point of 1680–1700 deg. C., which is within the above range, or else mixtures in variable proportions of silica and potassium felspar having meltings points between 1300 and 1680 deg. C. produce distorted weld beads.

The melting point is thus a determining factor but not a sufficient one to obtain the best results. Experience has further shown that refractory materials having melting points close to the lower limit indicated above must also have a higher thermal diffusivity than the refractory materials whose melting points are closer to the upper limit. This diffusity must be in the range of $3.0 \times 10^{-3}$ to $15.0 \times 10^{-3}$ cm.$^2$ sec.$^{-1}$.

Thermal diffusivity is a well-known property in the refractory industry. It is given in the "International Critical Tables" by the formula:

$$t = \frac{K}{c\delta}$$

where
K is the thermal conductivity
c is the specific heat
δ in the apparent density The thermal conductivity K of materials having given the best results is in the range of $10 \times 10^{-4}$ to $40 \times 10^{-4}$ cal cm.$^{-1}$ sec.$^{-1}$ deg. C.$^{-1}$. The specific heat c of such materials is in the range of 0.18 to 0.23 cal/gr.

Figure 17:
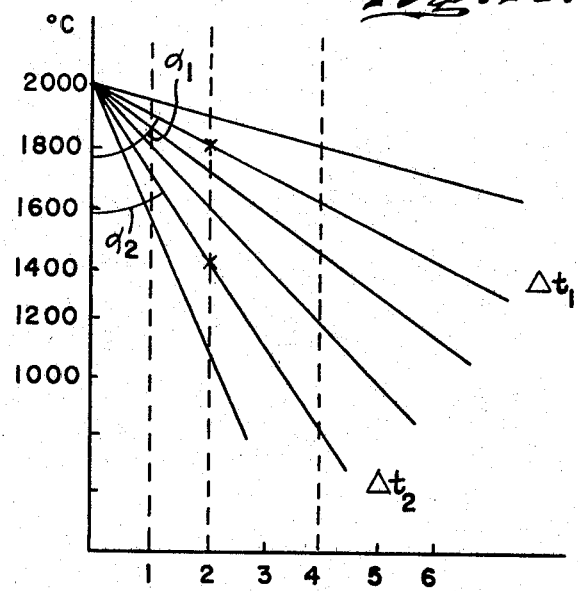
FIG. 17 is a graph showing curves of thermal diffusivity, with the slag thickness read as abscissae and the degrees centigrade as ordinates.

The effect of the interaction (melting point vs. Δt) can be schematized as follows: assuming for the molten metal a temperature of 2000 deg. C., the bundle of straight lines of FIG. 17 shows the tangents to the curves of thermal diffusivity. A measure of this parameter is given in a first approximation by the angles $α_1$ and $α_2$. It can be seen that for suitable diffusivities $Δt_1$ and $Δt_2$, materials having melting points of 1800 and 1350 deg. C., respectively, give a slag 2 mm. thick. When suitable conditions exist for the chemical composition, the melting temperature and the thermal diffusivity, as in the case of two of the eutectics in the Rankin diagram, namely (1) Pseudo-Wollastonite plus tridymite (melting point 1436 deg. C.),
(2) Pseudo-Wollastonite plus tricalcium disilicate (melting point 1455 deg. C.), or again for mullite (melting point 1810 deg. C.) and when the working conditions are suitable, the fillets obtained are always smooth, with good appearance, under a thin layer of slag 1 to 4 mm. thick.

In addition, the ease with which the slag can be removed must be taken into consideration, as it is always an important aspect of the attractiveness of a welding process. It is generally favorably obtained by a substantial difference between the thermal expansion coefficient of the slag and that of the solidified metal.

This thermal expansion coefficient is given by the relations:

$$E_c = \frac{10^{-7} dV}{V dT} \text{ for cubic expansion}$$

$$E_1 = \frac{10^{-6} dl}{1 dT} \text{ for linear expansion}$$

where V and l are the units of volume and length and T is the absolute temperature.

To obtain the best formulae, this linear coefficient must be in the range of $30 \times 10^{-6}$ to $50 \times 10^{-6}$ per deg. C., computed from the modules of English and Tuner for $SiO_2$, CaO, MgO, and of Mayer and Havas for the other compounds.

In this respect, it appears that materials based on CaO and $Al_2O_3$ will sometimes be preferable to materials based on MgO while, as fluxes, the alkali ($Na_2O$ and $K_2O$) sometimes will be better than $CaF_2$.

But the tendency to brittleness of the slag must still be taken into consideration. It increases with the thermal expansion coefficient but decreases when the product of flexibility by the square root of diffusivity increases.

In the welding industry, a high incidence of brittleness is not considered advantageous for the slag. For the ease of its removal, the preference is given to compact slag which separates automatically from the weld bead, or which pops off under the hammer in big chunks.

On the contrary, a slag having a high tendency to brittleness means often long and tedious removal, in small pieces, and especially in the case of thin layers of slag tending to remain attached to the edges of the weld beads.

Therefore, a low expansion coefficient is preferable. On the other hand, diffusivity and flexibility must be high. But it is obvious that great rigidity in the slag will be very favorable to the appearance of the weld bead. This appearance will be better when the pool of molten metal has been better supported during its liquid phase, and firmly contained during its cooling. This will depend on the ability of the unfused granules to nest within each other, on the curve of viscosity vs. temperature for the fused flux and on the flexibility of the solidified slag.

Since the flexibility must remain small, it will be desirable to obtain a great diffusivity. As was said, this is the advantage of fluxes having a melting point in the order of 1300 to 1450 deg. C.

After removal of the trough when the welding operation has been completed, it will be seen that the consumption of flux is low and that a thin layer of slag covers the metal perfectly, giving also perfect penetration at the roots of the fillet. During cooling, the difference between the expansion coefficients of the metal and of the powder will manifest itself by cracking noises. When cold, the slag is removed very easily with a wire brush. The weld fillet appears then to be very sound, perfectly smooth and even, with the correct reinforcement and requiring no touch up.

Hereafter are a few examples of molten flux compositions suitable for all the conditions listed and giving all the results wished for:

TABLE 1

| | Percent | | | |
| --- | --- | --- | --- | --- |
| | Formula I | Formula II | Formula III | Formula IV |
| $SiO_2$ | 60–70 | 40–50 | 50–60 | 45–55 |
| CaO | 20–25 | 55–65 | 25–35 | 35–45 |
| MgO | 2–4 | 1–4 | 2–4 | 2–4 |
| $Al_2O_3$ | 2–4 | 1–4 | 2–4 | 2–4 |
| FeO | 1–2 | 0.5–2 | 1–2 | 1–2 |
| $Na_2O$ | 0.5–2 | 0.5–2 | 0.5–2 | 0.5–2 |
| $K_2O$ | 0.5–2 | 0.5–2 | 0.5–2 | 0.5–2 |
| $CaF_2$ | 1–2 | 1–4 | 1–2 | 1–2 |

When flux is used to protect the arc, as in the submerged arc welding process, it is obvious that the working conditions will be simplified by using one and only one flux as powder to support the pool of metal and as a welding flux. Since the flux used participates in the metallurgy of welding, it must possess some chemical reactivity enabling it to dissolve metallic oxides (rust, scale, residues of flame-cutting) which are present on the plates as well as Zn and/or ZnO originating from the protective coating favored by some shipyards.

It is therefore true that the flux which, in the present case, is used to support the molten pool at the back side of the joint could also be used to protect the arc. However, in the case of the use of a single powder both as a support for the metal pool and for arc protection, it is desirable to increase its chemical reactivity while maintaining its physical characteristics as described previously.

The simplest and most effective method consists in adding to one of the powder compositions shown in Table 1 a suitable percentage of another flux having well-known reactive properties, for instance a fused manganese type flux. During the welding operation, every component of this mixture retains its individual physical and chemical character during a time sufficient for the combined effects to give a final result better than could be obtained with a fused flux having the same chemical composition as the mixture.

The proportion of manganese flux present in the mixture may vary from 0 to 40%. Beyond that percentage, welding remains possible but the influence of the manganese flux becomes prominent and manifests itself by an alteration of the needed physical properties which, as said before, produce a good appearance of the weld back of the joint. One example of a composition of a fused flux of the manganese type which gives good results is:

| | Percent |
|---|---|
| $SiO_2$ | 38–45 |
| MnO | 29–40 |
| CaO | 5–15 |
| $CaF_2$ | 4–10 |
| $Al_2O_3$ | 3–6 |
| FeO | 0.5–2 |
| MgO | 0.5–4 |
| $Na_2O$ | 0.5–2 |
| $K_2O$ | 0.5–2 |

A necessary precaution is to use for this mixture granules having excellent interlocking qualities (the screen analysis, the apparent density and the grain shape will therefore be similar) and enough mutual abrasion resistance (similar surface conditions and hardness) to avoid any demixing, either during transportation or when the fluxes are being handled.

Any demixing would result, not only in heterogeneity in local composition detrimental to the appearance of the weld, but also in excessive consumption of material because reuse is not possible.

In some of our tests where the arc was protected by a flux, we used primarily synthetic fluxes, but good results were also obtained with raw materials used alone or mixed with industrial metallurgical slags.

Of course, coated agglomerated or sintered fluxes may also be used to obtain in part or in whole the effect made possible by the invention. But this solution is both more costly and more complex, without adding any advantage.

The device shaped as a trough and described hereabove is only one of the forms of execution which can be designed to support the refractory material, but it goes without saying what any other automatic stationary or movable devices, such as conveyor belts for the refractory material, or made themselves of this refractory material, used as a support below the joint and which eliminate the manual operations of applying a support on the back face of the joint or weld groove to be welded, thereby increasing productivity and efficiency of the work, can be used in the process as per the invention.

To further develop the efficiency of operations, it will be advantageous to use automatic means of welding, as known, where several electrodes connected in parallel in the welding circuit are arranged in tandem along the joint being welded, thereby increasing the speed of the welding operation by a factor equal to the number of electrodes used simultaneously.

Even though the process of the invention permits welding joints of great length without requiring visual inspection of the back face of the weld, until the work is completed, to check whether the penetration conforms to expectations, it is obvious that it is always wise to verify the progress of the operation before welding is completed, rather than working blind. One of the drawbacks of most systems of backing strips and other fixed metallic supports is the inability to check the welding operation as it proceeds. The trough or sheath acting as a support for the refractory material under the back side of the joint will therefore be advantageously divided in short lengths set end to end along the joint and supported individually. In this manner, as soon as one section has been welded, the corresponding support can be removed to verify the quality of the back face of the weld.

Thanks to the refractory powder filling the troughs, there is no risk that imperfect junction between two successive sections of the trough might cause leakage.

Furthermore, the interruptions between successive lengths of the trough have the added advantage of helping to obtain good contact with the plate whenever the surface of the latter would be uneven. Finally, no matter what total length the joint will have, troughs of short length will be needed only to the full length of the joint, without waste.

Practical considerations such as the plate thickness, the power sources available, atmospheric conditions, drafts from wind, heavily rusted plates, the necessity or the difficulty of fully automated work, will guide the user in the selection of one or the other variant of the process of the invention.

In practice, it happens rather often that the plates being welded are no longer plane when they are about to be welded, because they have been heated previously to execute other welds in the vicinity of the edges now to be welded. Furthermore, after repeated use of the trough, it happens that the latter also gets distorted.

If the deformations of the plates and/or trough result in spacing the plates from the trough in a portion of its length, it becomes more difficult to pack the refractory powder moderately tight with pressure against the plates suitable to produce a weld bead showing a satisfactory reinforcement, because the powder leaks out through the gaps between trough and plates. In the case where good pressure before welding has nevertheless been obtained, it can happen that during welding the said gaps will shrink because of distortion of the plates and/or the trough and that the pressure of the powder against the plates will become greater than that which would result in a good-looking reinforcement. It has been found that in such cases, undercutting sometimes appears in the plate or the reinforcement changes into a groove.

If, on the contrary, the plates and/or the trough are distorted with the effect of increasing locally the spacing between trough and plates, then the refractory powder which was initially packed tight at the suitable pressure against the plates ceases to keep contact with the latter or with one of the plates. It could then happen that the weld pool will flow out laterally and that the reinforcement will take an irregular and poor-looking shape. Furthermore, it has sometimes been found that such a reinforcement may be imperfectly welded to the plate.

With a view to remedy these difficulties, elastic contact between said refractory powder and the plates being welded is maintained, by means of an elastic and compressible felt member consisting of fine fibers or refractory material.

Thanks to the use of a compressible cushion of this type, a harmful over-pressure can easily be avoided during the packing of the powder at the time of filling the trough, should the amount of powder introduced in the trough be a little greater than what is needed to obtain a nice reinforcement. If, during welding the gap between the trough and the plates being welded should increase, the elasticity of the compressible cushion would tend to expand the latter to the initial volume it occupied before filling, and therefore the powder remains tight against the plates. If, on the contrary, the gap between the trough and the plates being welded should be reduced during welding, the resulting over-pressure of the refractory powder against the plates will remain moderate because the cushion can easily be further compressed.

It has already been proposed to maintain a layer of refractory granules elastically tight against the plates being welded, by means of a pneumatic sleeve set between the bottom of the trough and a free metallic strip supporting the granules. This method is costly due to the equipment it requires. Moreover, it is very bulky because the layer of granules must be thick in order to protect the sleeve against heat. Furthermore, it is sometimes difficult to use because openings needed to pass the sleeve must be provided through the stiffeners already welded on the plates. Finally, it may happen that pneumatic pressure will force granules between the plates, especially in locations where the plates are far apart due to careless preparation.

In such a case, an elastic and compressible cushion is preferably used, overlapping the edges of the trough in order to have the cushion press against the plates being welded when the trough is pressed against the latter.

By this arrangement, should the elasticity of the elastic and compressible cushion be insufficient to keep the refractory powder pressed against the plates in the case where the distance between the plates and the trough would increase abnormally during welding, then the portions of this cushion pressed against the plates would prevent any leakage of the powder and would contribute to obtaining a satisfactory reinforcement.

This cushion consists of cotton-like felt made of fine fibers resulting from the fusion of a mixture consisting essentially of alumina and silica with a higher content of alumina than of silica.

This arrangement leads to a change in the composition of the refractory powder filling the trough pressed against the plates.

Then, a refractory powder is used, consisting in a mixture of:

(a) 43 to 63% of an ingredient comprising 50 to 60% of $SiO_2$, 25 to 35% of CaO, 2 to 4% of MgO, 2 to 4% of $Al_2O_3$, 1 to 2% of FeO, 0.5 to 2% of $Na_2O$, 0.5 to 2% of $K_2O$, 1 to 2% of $CaF_2$;

(b) 35 to 50% of an ingredient comprising 30 to 40% of SiO, 55 to 65% of $Al_2O_3$ and 5 to 10% of various oxides such as CaO, MgO, $Fe_2O_3$, $TiO_2$, $Na_2O$, $K_2O$;

(c) 1 to 3% of cryolite;

(d) 1 to 4% of a deoxidizer.

The deoxidisers which can be used are, preferably, strong deoxidizers such as aluminum, silicon, magnesium, calcium and titanium. Some of these deoxidizers may be used in metallic form, others being usable only in a combined form. Silicon can be used with advantage.

In FIG. 7 a U-shaped trough 6 is shown, in which elastic and compressible cushions are laid parallel to both flanges or arms of the U and to the web or base. Said cushions consist in fine fibers of ceramic material compacted to make a cotton-like felt. These fibers are advantageously obtained from a molten mass consisting essentially in alumina and silica, with a higher proportion of alumina than of silica. Fibers having the chemical composition of 51.2% of $Al_2O_3$, 47.4% of $SiO_2$, 0.7% of $B_2O_3$ and 0.7% of $Na_2O$ are perfectly suitable to realize the invention. These fibers are obtained, for instance, by blowing high speed gases on a molten mass having the aforesaid composition and heated to a temperature higher than its melting point which is 1760 degrees centigrade. Fibers obtained by this process have a diameter between two and ten microns, their average size being 2.5 microns. They can resist a permanent temperature of 1260 deg. C.

They can also be used at higher temperatures of shorter periods of time.

The cushions parallel to the flanges or arms of the trough are designated 23. They are arranged with their long faces parallel to the flanges or arms. Upon the web or base of the trough, two cushions designated 23' have been laid with their long faces parallel to the web or base. These cushions 23' are set between the cushions 23 to assist holding the latter against the flanges.

Figure 8:
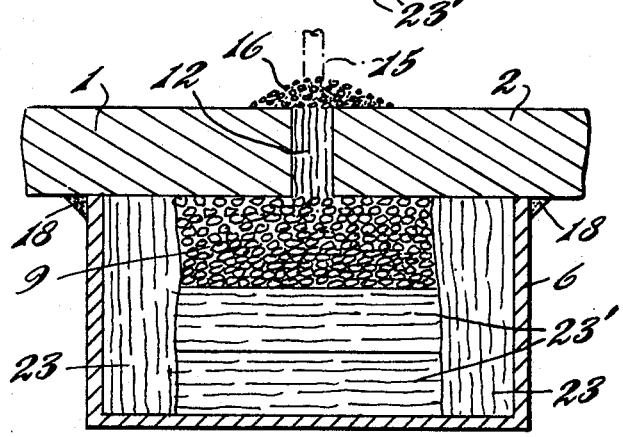
FIG. 8 is a section across the trough of FIG. 7 after pressing it along a joint between two horizontal plates to be welded by the submerged arc process, the joint being filled with predominantly metallic powders plus a layer of welding flux over the joint.

The cushions 23 have a height such as to exceed by a few millimeters the upper level of the edges of the flanges of the trough. The space above the cushions 23' and between the cushions 23 is filled completely with refractory powder. In FIG. 8, the trough filled in this manner is pressed against the lower face of horizontal plates being welded, such as designated by 1 and 2 in FIG. 8. The trough is held in such position by a few weld tacks such as 18. In this setting, the cushions 23 are lightly compressed by their direct contact with the plates, while cushions 23' are compressed lightly by the pressure they receive from the refractory powder 9. Since these cushions are very compressible, the pressure to which this powder is subjected from the reaction of the cushions remains moderate. Furthermore, due to the great elasticity of said cushions, should the trough separate from the plates during welding, the powder would remain in elastic contact with the plates with unchanged pressure. Finally, because the cushions 23 exceed the level of the upper edges of the flanges of the trough, they contribute to prevent leakage of the powder through a gap which could exist between the plates and the flanges or arms of the trough if these cushions were not initially higher than these flanges or arms.

In FIG. 8, a predominately metallic powder 12 is shown in the joint between the plates being welded. The joint is covered with a layer of welding flux 16 intended to permit welding by the submerged arc process with a fusible electrode such as 15 shown in interrupted lines. By the process of the invention, the fushion of said powder in the joint permits welding the plates with access to one face only, even when the edges of the plates facing each other across the joint have not been carefully set. The refractory powder 9 held in position against the lower face of the plates prevents piercing the joint even when the distance between said edges reaches several millimeters. This powder protects the cushions 23 and 23' at the same time against the heat generated by the weld pool during welding. They can thus be used many times before being replaced.

Figure 9:
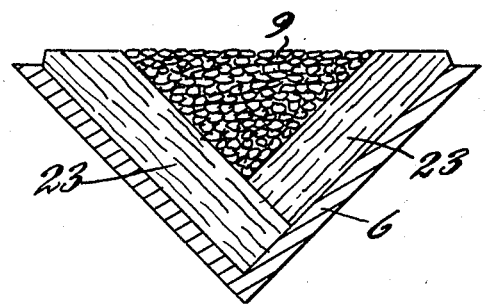
FIG. 9 is a cross-section similar to that of FIG. 7 in the case the trough is V-shaped, ready to be pressed against the horizontal plates being welded.

In FIG. 9, another trough is shown ready to be pressed against the plates being welded. This other trough is shaped as a V. On both flanges, elastic and compressible cushions such as 23 have been laid reaching beyond the upper edges of the flanges, upward.

Figure 10:
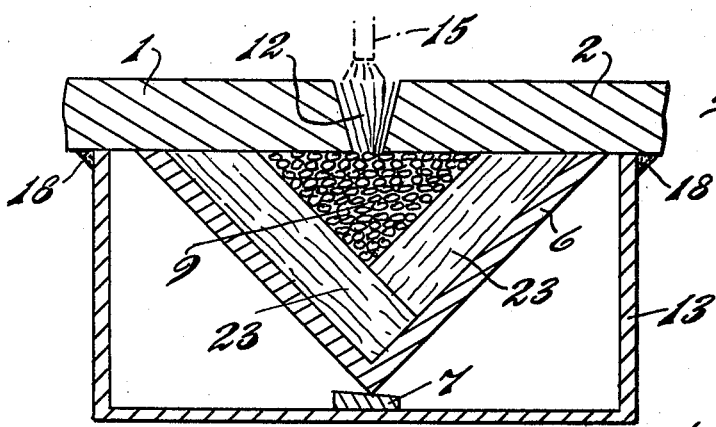
FIG. 10 is a section across the trough of FIG. 9 after pressing it along a joint between two horizontal plates being welded by the visible arc process under gas protection, the joint being filled with predominantly metallic powders.

In FIG. 10, said trough is shown being held against the lower face of the plates 1 and 2 by means of wedges 7 engaged between them and U-shaped braces 13 attached to the plates by a few weld tacks 18 to be removed later. The edges of said plates have been lightly chamfered even though such chamfering is not required, as shown in FIG. 10. The welding process shown in FIG. 10, is the visible arc process with gas protection. Processes of automatic welding other than those shown in FIGS. 2 and 4 can of course also be used.

The refractory powder 9 used together with the elastic and compressible cushions as described in FIGS. 7 to 10, may have one of the compositions of the invention shown in Table 1, particularly as per Formula III of this Table. In accordance with said formula, the powder contains 50 to 60% of $SiO_2$, 25 to 35% of CaO, 2 to 4% of MgO, 2 to 4% of $Al_2O_3$, 1 to 2% of FeO, 0.5 to 2% of $Na_2O$, 0.5 to 2% of $K_2O$, 1 to 2% of $CaF_2$.

Experience has shown that there is interest of using as a refractory powder a mixture consisting of:

(a) 43 to 63% of powder as per Formula III cited hereabove;

(b) 35 to 50% of an ingredient comprising 30 to 40% of $SiO_2$, 55 to 65% of $Al_2O_3$ and 5 to 10% of various oxides such as CaO, MgO, $Fe_2O_3$, $TiO_2$, $Na_2O$, $K_2O$;

(c) 1 to 3% of cryolite;

(d) 1 to 4% of a deoxidizer.

Strong deoxidizers are preferably used, such as aluminium, silicon, magnesium, calcium, titanium, some of which are usable only in combined form, as in alloys.

Within the limitations mentioned above, the refractory powder may advantageously consist of a mixture of 55% of the powder as per Formula III of Table I with 40% of the product as per (b) above, plus 2% of cryolite and 3% silicon.

In shipyards, when the metal plates for ship-building can be assembled in nearby assembly halls prior to being fitted on the ship, the arrangement in which the support at the back of the joint has been made elastic is preferably used for welding these plates.

Figure 11:
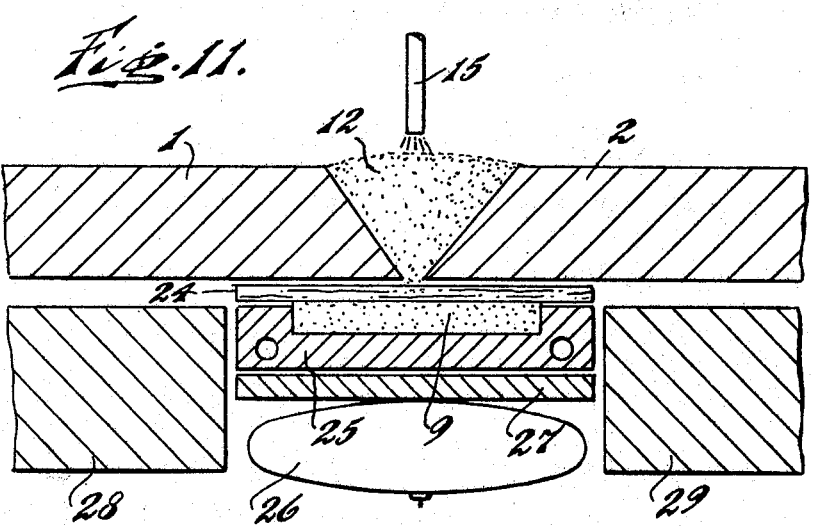
FIG. 11 is a section across the joint to be welded and the device acting as a support which is a variant on the methods of applying the device acting as a support described by the preceding figures.

The device whereby the support is made elastic is rather cumbersome, however, and efforts are under way to make it as easy to handle as possible. Among the methods applied to make the device easier to handle is one which consists of reducing the quantity of refractory granules in the trough placed at the back of the joint, but since this granule layer cannot be reduced without unfavourably affecting the quality of the weld bead an attempt was made to counterbalance the quantity of granules withdrawn by interposing a thin strip of braided non-metal fibre between the back of the joint and the trough (FIG. 11).

During the welding operation the melting of the predominantly metal powder in that part of the joint which is in contact with the fibre strip causes the latter to melt on the side opposite it, producing a groove. Through the flexibility of the strip of braided non-metal fibre, combined with the elastic effect of the support which enables it to adapt perfectly to irregularities on the surfaces of the plates with which it is in contact, this groove has the great advantage of being perfectly straight and of strictly regular length and depth, for that part of the molten metal which is in contact with the groove moulds itself on the latter and keeps after cooling the shape it thus obtains.

Moreover, when the strip is pierced right through, the surface layer of the underlying powder in contact with the strip becomes sintered and maintains a bottom for the groove.

It is clear, of course, that excessive current levels would cause excessive melting of the braided strip and part of the underlying powder with it, which would have the drawback of wiping out the advantage of using the strip.

The same would apply if the strip were not thick enough. For this reason, limiting current and tape thickness values were determined for various plate thicknesses; within these limits the said results can be obtained.

These values are shown in the table below.

TABLE 2

| Plate thickness in mm. | Current in amps. | Tape thickness in mm. |
|---|---|---|
| 8 | 550–650 | 1.5–3 |
| 15 | 700–800 | 1.5–3 |
| 20 | 850–95 | 3–6 |
| 25 | 1,000–1,100 | 3–6 |
| 30 | 1,250–1,350 | 3–6 |

From this table it can be seen that the strip thickness is a direct function of the current applied, which in turn, of course, is a function of the thickness of the plates to be welded.

A further advantage of this arrangement is that an ordinary refractory material is used as the powder underlying the strip.

As regards the nature of the braided non-metal fibre forming the strip, several types of fibre were used and it was found that silico-aluminous type fibre, whose melting point is around that of the metal, was very well suited to the formation of this groove in the strip during welding. For instance, a fibre which gave especial satisfaction was sillimanite fibre.

As shown in FIG. 11, under the space separating plates 1 and 2 to be welded, which is filled with predominantly metal powder 12, is placed a strip of braided non-metal fibre 24, resting on a bed of refractory granules 9 contained in a trough 25. This trough in turn rests on a pneumatic tube or tire 26 of elastomeric material so that the part of the device acting as a support for the braided strip exerts an elastic effect from a support not shown and thus provides the strip with the greatest possible adaptability at the back of the joint to be welded while exerting constant pressure all over.

It may possibly be advantageous to place a thickness of asbestos 27 between the trough 25 and the tire 26, to increase the flexibility of the device even more. The unit is held in place from the side by rigid flanks 28 and 29.

The braided strip is about 3 mm. thick, and the bed of refractory granules is also about 3 mm. thick.

Figure 12:
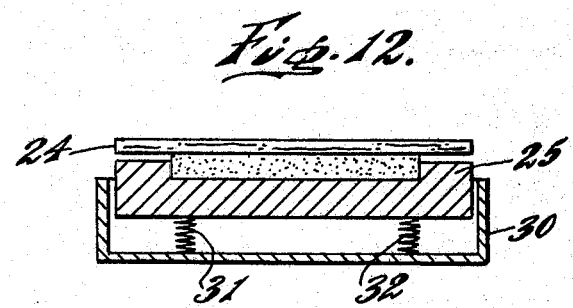
FIG. 12 is a cross-section of a sub-variant on the method of applying the device described by FIG. 11.

In the application shown in FIG. 12, trough 25 enters telescopically between the vertical inside walls of casing 30 and rests quite simply on a pair or a double horizontal line of suitable spiral compression springs 31 and 32, or on a pneumatic tire (not shown) placed between the outer surface of the bottom of the trough and the inner surface of the bottom of the casing 30.

This application makes it possible to simplify the support device.

The trough is preferably made of copper and fitted, if necessary, with an inside circuit for liquid coolant flow.

The process described is mainly intended for welding in the downhand position, but major deviations in the plate position with respect to the horizontal can be tolerated.

Figure 13:
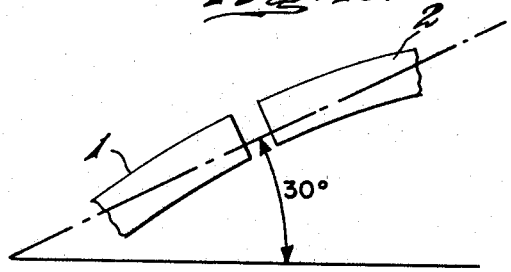
FIG. 13 is a schematic view of the arrangement of inclined plates.

Taking into consideration the angle of free rolling of the granular refractory and of the essentially metallic powders, as well as the shape of the plates, which can be curved, either convex or concave, the angle of deviation from the horizon which can be given to the plates could reach 30 degrees in the case where the joint itself remains horizontal, as shown in FIG. 13, but it could only reach 20 degrees when the joint itself is inclined with respect to the horizon. This is the case in particular for thinner plates where the molten pools are smaller and where welding speeds are higher, causing faster cooling.

Figure 14:
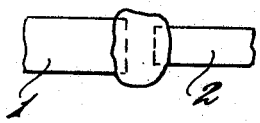
FIG. 14 is a schematic front view of a weld between two plates having different thicknesses.
Figure 15:
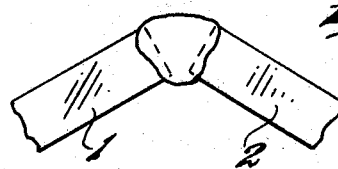
FIG. 15 is a schematic front view of a joint between plates set at an angle to each other.
Figure 16:
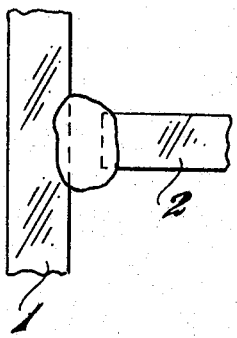
FIG. 16 is a schematic front view of a joint between the edge of one plate and the face of another.

But the application of the process of the invention is not limited to the welding of joints conforming to examples illustrated by the figures. Plates having different thicknesses can also be welded together as shown in FIG. 14. Plates joining each other at an angle as shown in FIG. 15 can also be welded, as well as joints between the edge of one plate and the face of another as in FIG. 16.

It goes without saying that the invention is also applicable to all types of joints where the gap or welding groove between the edges is of any shape whatever.

As said before, one of the characteristics of the process of the invention is the introduction into the joint being welded of an essentially metallic powder. The known U.S. Pats. 2,927,990, 3,022,413 and 3,253,121 have this in common with the subject matter of the present invention that they use means which were perfected by the latter. These means consist mainly in laying down mobile metallic particles, in striking an electric arc inside this mass to melt it entirely together with the adjacent surface of the base metal. These processes have the advantage of reducing in this manner the penetration of the weld metal into the base metal. Another advantage of the invention covered by Pat. 3,022,413 is that the metallic particles can be simply mixed and weighed to form the desired alloy, so that it is not necessary that all the metallic particles be of the same chemical composition. As for Pat. 2,927,990, it claims the possibility of agglomerating granules of metallic particles having different compositions, when desired, binding them with a solution of sodium silicate comprised between the 30 deg. Baumé type and the 47 deg. Baumé type, solution being added in the proportion of 15% of the weight of the metallic particles, and then drying at a temperature of 300 to 800 deg. F.

The improvement brought to these means by the process of the invention consists in that, first, these metallic particles can be obtained for instance by chopping small lengths of small size wires, or by cold pressing a mixture of commercial metallic powders, with or without sintering, and finally milling the mixture down to the desired size of granules. Atomization of a batch of known chemical composition can also produce particles having the desired shape, size and chemical composition.

Secondly, the mixture of essentially metallic powders may include small amounts of alkaline-earth carbonates to improve the mechanical properties of the deposited metal. For instance, the addition of 0.5 to 5% of magnesium carbonate, or of dolomite (which is a double calcium and magnesium carbonate) or of barium carbonate plus calcium carbonate, does not reduce the apparent density appreciably and acts rather favorably in the following manner:

Even though small amounts of nitrogen and water vapor may be present, and get into the arc atmosphere, such harmful gases, metallurgically speaking, are displaced by the $CO_2$ formed by the decomposition of the carbonates. The MgO, BaO and especially CaO oxides which are liberated act thus in a positive manner to reduce S and especially P which are both unfavorable for the mechanical properties and particularly for the impact strength of ferrous alloys at low temperature.

The mixture of essentially metallic nature may also include fluidizers such as alkali fluorides, alkaline-earth and aluminum fluorides and their combinations, thereby reducing in the molten pool the amount of microinclusions generally composed of silicates. The welds so obtained by the automatic or semi-automatic arc welding process, at high speed, in one or two passes, on one side of the plates only, as per the invention, conform to the most exacting specifications, such as those of the Lloyds Register of Shipping.

Due to:

(a) a lower penetration, which means less dilution with less absorption of harmful elements such as C, S, P, As and, in a lesser proportion, Si, into the base metal;

(b) flexibility in selecting the desired composition of the essentially metallic mixture, to which all the known deoxidizers can be added, such as Al, Mg, Ti, Si, etc. and also elements such as Cr, Mo, Ni, etc.;

(c) by the additional action of small additions of compounds mentioned above, such as alkaline-earth carbonates and fluorides which improve the quality of the molten metal pool in conformity with the chemical practice of the steel mills. It is possible to obtain weld deposits of exceptional quality for all the varieties of low carbon and refined steels for which the tensile strength covers the range of 35 to 45 kg./mm.$^2$ as well as the range of 70 to 90 kg./mm.$^2$, including the in-between ranges such as 41 to 50 kg./mm.$^2$, 52 to 62 kg./mm.$^2$ and 58 to 70 kg./mm.$^2$ Such results are in most cases very difficult to obtain by present methods of automatic or semi-automatic welding.

However, it is necessary to take great care in selecting the relative size of the granules of the ingredients which are essentially metallic used in the mixture introduced in the gap between the plates being welded. If the size of the granules is ill-chosen, some de-mixing of the essentially metallic particles may result in deposits having a heterogeneous chemical composition.

Investigations made in this field have proven that, for mixtures of powders of a given density, sizes of grains exist for which de-mixing compatible with the requirements or practice is held at a minimum. It should be noted that this applies to mixes of granules in the range of 6 to 325 mesh, for example.

Cold compression of essentially metallic powders to which inorganic compounds have been added, such as carbonates or fluorides, with or without a slight sintering followed by milling and sifting, also provide the desired results.

For welding steel used in ships, of the E type for instance, the electrode wire, flux, support and essentially metallic powder mixture may have the following properties in sizes and compositions:

Wire: 5/32″ or 3/16″, depending on the thickness to weld, normally containing 0.5% Mn as used for submerged arc welding.

Flux: commercial fused flux, for example of the following composition:

|  | Percent |
| --- | --- |
| $SiO_2$ | 38–45 |
| MnO | 29–40 |
| $CaF_2$ | 4–10 |
| CaO | 5–15 |
| MgO | 0.5–4 |
| $Al_2O_3$ | 3–6 |
| FeO | 0.5–2 |
| $Na_2O$ | 0.5–2 |
| $K_2O$ | 0.5–2 |

Support: a refractory material according to the invention.

Essentially metallic powder: comprising 90 to 93% iron powder, 4 to 7% ferroalloys and about 3% cryolite or calcite.

Here are examples of compositions used to weld all steel types, in percentage by weight:

TABLE 3

|  | For welding Bessemer steel 48, kg./mm.$^2$ | For welding open-hearth steel 50, kg./mm.$^2$ | For welding high yield steel EH52 type 52, kg./mm.$^2$ |
| --- | --- | --- | --- |
| Iron powder (for inst. the reduced type) | 90 | 91.2 | 92.7 |
| Ferromanganese | 5 | 4 | 2.5 |
| Ferrosilicon | 2 | 1 | 1 |
| Ferromolybdenum |  | 0.8 | 0.8 |
| Cryolite or calcite | 3 | 3 | 3 |

All the powders used in the above examples have sizes in the range of 60 to 150 mesh to prevent de-mixing or segregation and they are mixed together.

Applications of the process of the invention for welding steel plates have been performed using parameters listed in the following table:

TABLE 4

| Plate thickness, mm. | Spacing between plates, mm. | Offset in height, mm. | Wire size, mm. | Current, amps | Current, volts | Welding travel speed, cm./min. |
| --- | --- | --- | --- | --- | --- | --- |
| 10 | 5–12 | 0–5 | 4 | 700 | 28 | 40 |
| 20 | 7–17 | 0–10 | 4 | 1,000 | 32 | 25 |
| 30 | 8–18 | 0–10 | 5 | 1,300 | 34 | 20 |
| 40 | 10–20 | 0–10 | 5 | 1,500 | 34 | 18 |

The base metal was a steel having 41–50 kg./mm.$^2$ tensile strength. The edges of the plates had not been prepared. Care was taken that the plates would not be excessively rusted.

The flux was a normal fused manganese silicate type flux. The welding wire was a standard, 0.5% Mn welding wire. The current used in the above applications was DC, but AC current from a power source having a flat or drooping characteristic curve could be used for plates 10 mm. to 20 mm. thick.

Welding was made in a single pass up to 40 mm. thickness. The parameters were not changed during the welding operation, despite variations in the spacing between the edges of the plates and in the offset in height to the extent shown in the above table.

I should be noted however that despite the care taken to avoid using excessively rusted plates, it is permissible to weld plates more heavily rusted than normally tolerated in standard automatic or semi-automatic welding techniques, because in the comparatively bulky welding pool gases caused by reactions such as $C+O$ have time to escape, and because of the presence of deoxidizers such as Si, Ti, Al in the mixture of essentially metallic powders.

On the other hand, the steel can be standard low carbon steel or high tensile steel such as the 52 kg./mm.² type. In the latter case the welding parameters are about the same, but the mixture of metallic compounds and carbonates (permissively fluorides) must be prepared differently, as shown in Table 3.

For currents higher than 1000 amps, it is better to use a trade flux suitable for high amperage, since the use of the flux mentioned before would cause the fillet to be irregular.

Another advantage obtained by the process of the invention is in the great simplification of the formulation of the flux forming the protecting slag over the pool of molten metal.

As known, the conventional fluxes used in automatic welding are fused fluxes (generally in electric furnaces) or agglomerated fluxes. They contain, in the first case, MnO to prevent excessive oxidation of the manganese in the wire, and ferromanganese and/or ferrosilicon in the second case, acting as deoxidizers. There are also fused fluxes which have been coated with a mixture of binding silicate, slag-forming materials and alkaline deoxidizers. These are known.

The process of the invention is novel in the fact that the pool may be deoxidized by additions of deoxidizers in the essentially metallic powder mixture, thereby permitting the use of much simpler fluxes, cheaper than the conventional fluxes just mentioned.

Here are a few examples of such fluxes in percentages by weight:

TABLE 5

| | Formula I | Formula II | Formula III | Formula IV |
|---|---|---|---|---|
| Natural wollastonite | 20 | | 30 | 30 |
| Silica | 10 | | 20 | 20 |
| Calcined bauxite | 50 | 25 | 25 | |
| Rutile sand | | 25 | | |
| Zirconia sand | | 20 | | |
| Potassium felspar | | 25 | | 25 |
| Calcined magnesium oxide | 5 | | 10 | 10 |
| Fluorspar | 15 | | 15 | 15 |
| Cryolite | | 5 | | |

A simple mixture of natural inorganic mass-produced materials, relatively inexpensive, properly selected and suitably granulated, containing none of the conventional metallic deoxidizers, and little or no MnO, may then be used.

When using such types of fluxes, the refractory material acting as a support is identical to that described in Table 1. However, when using a 0.5% Mn wire as already suggested for welding low-carbon and low-alloy steels, it is necessary to increase the deoxidizing power of the essentially metallic powder. To do so, about 2% of ferromanganese, 3% of ferrosilicon and 1% of aluminum are added to the powders such as listed in Table 3 for the welding of various steels, so that the new compositions would include 84 to 87% of iron powder, 10 to 12% of ferroalloys, about 1% of aluminum and about 3% cryolite or calcite by weight. For instance, to weld Bessemer steels, open-hearth steels or high yield steels, the essentially metallic powder as per the invention would consist in a mixture of metallic powders, alkaline earth carbonates or fluorides, in the proportions shown in the following table, expressed in percentage by weight:

TABLE 6

| | For welding Bessemer steel 48, kg./mm.² | For welding open-hearth steel 50, kg./mm.² | For welding high yield steel EH52 type 52, kg./mm.² |
|---|---|---|---|
| Iron powder (for inst. the reduced type) | 84 | 85.2 | 86.7 |
| Ferromanganese | 7 | 6 | 4.5 |
| Ferrosilicon | 5 | 4 | 4 |
| Aluminum | 1 | 1 | 1 |
| Ferromolybdenum | | 0.8 | 0.8 |
| Cryolite or calcite | 3 | 3 | 3 |

All the powders used in the above examples are granulated between 60 and 150 mesh to avoid demixing and segregation, when these powders are simply mixed without the help of a binder.

Finally, when a single flux is to be used as a support for the metal pool and as a welding flux, the chemical reactivity of this flux may be strongly reduced, and such reduction is compensated by additions of deoxidizers in the essentially metallic powder. It should be noted here that the compositions of fluxes of Table 5 are suitably only as protective flux for the arc and not as a support material because these compositions do not fulfill the required conditions of the progress of the invention, specified previously.

In fact, powders which can be used both as welding flux and as support consist of mixtures of the fluxes of Table 1 and of the formulations stated immediately preceding Table 3, used in the following proportions in percent by weight:

Percent
Flux as in Table 1 _____ 65–80
Commercial fused flux as in formula immediately preceding Table 3 _____ 35–20

The grain size of such powders can be between 6 and 325 mesh, with one powder being of similar grain size to the other to avoid demixing.

When using this flux above and below the molten pool, the 0.5% Mn welding wire must be used as well as the essentially metallic compositions of Table 6. Thus, welding in the shipyards becomes much simpler: a single type of wire, a single type of flux and only a few different compositions of essentially metallic powders suited to the various types of steels to be welded.

Generally speaking, the essentially metallic powders used to weld steels by the process of the invention, will consist in mixtures of metallic compounds such as FeMn, SiMn, FeSi, FeCr, Ni, Cu, FeTi, Al, MgAl, Mg, FeMo, FeV with natural or manufactured chemicals such as calcite, magnesite, dolomite, $CaF_2$, cryolite, and with iron. The ingredients of each of these groups may be used in the formulation either individually or associated in percentage by weight not exceeding 10% for FeMn, 5% for SiMn, FeSi, FeCr, Ni and/or Cu; 3% for FeTi, Al, MgAl (50:50) and/or Mg; 2% for FeMo and/or FeV; 5% for calcite, magnesite, dolomite, $CaF_2$ and/or cryolite, with the balance of 84 to 93% consisting of iron.

In the case where the arc traveling along the joint is not submerged, any electrode of the trade, bare or cored wire, may be used with or without gas protection in the process of the invention, although it would be preferable to use flux-cored wire under gas protection covered by Belgian Pat. 547,243, 550,612 and 610,774.

Furthermore, the composition of the particles of the essentially metallic powder may always be combined with that of the wire, of the electrode or of the cored wire, to correspond to the desired chemical composition of the final deposit, thereby conforming to the desired metallurgical and chemical properties of the various base metals.

The welding process of the invention is applicable to boiler making and to sheet and plate metal work in all forms.

Unless clearly indicated otherwise, all percentages herein are percentages by weight.

All mesh sizes stated herein are Tyler standard mesh per linear inch.

Having thus described my invention what I claim as new and desire to secure by Letters Patent is:

1. A process of electric arc welding of two metal plates, which comprises disposing them in spaced relation to form a substantially horizontal gap between each other, at least one of the plates being horizontal, applying freely to the back side of said gap a support consisting of a loose granular fluxing material which has a melting point ranging between 1350 and 1450° C., has a coefficient of expansion from heat ranging between $30 \times 10^{-6}$ and $50 \times 10^{-6}$ per deg. C. as computed from the International Critical Tables, and has a thermal conductivity ranging between $10 \times 10^{-4}$ and $40 \times 10^{-4}$ cal. cm.$^{-1}$ sec.$^{-1}$ deg. C.$^{-1}$, introducing into said gap, a powder having a preponderance of metallic particles and having an effective quantity of fluxing ingredients including deoxidizers and fluidizers, striking an arc between a fusible electrode introduced from above and said powder and progressing the arc at least once along said gap on the upper side only thereof, whereby a portion of the loose granular fluxing material becomes viscous and supports the weld metal, and when the viscous material solidifies it is easy to remove and comes off in big chunks.

2. A process of claim 1, wherein the powder having a preponderance of metallic particles comprises from 84 to 93% of iron, at least one substance of the first class consisting of FeMn, SiMn, FeSi, FeCr, Ni, Cu, FeTi, Al, MgAl, Mg, FeMo and FeV at least one substance of the second class consisting of calcite, magnesite and dolomite, at least one substance of the third class consisting of fluorspar and cryolite, in an amount of not more than 10% of FeMn, not more than 5% of SiMn+FeSi+FeCr+Ni+Cu, not more than 3% of FeTi+Al+MgAl+Mg, not more than 2% of FeMo+FeV, and from 3 to 5% of calcite+magnesite+dolomite+fluorspar+cryolite, the amount of calcite+magnesite+dolomite and the amount of fluorspar+cryolite being in a ratio of 1 to 3.

3. A process of claim 1, which comprises protecting the weld by a flux, said flux and said loose angular material consisting of a mixture of 65 to 80% by weight of a flux having the following composition in percent by weight.

| | Percent |
|---|---|
| $SiO_2$ | 40–70 |
| CaO | 20–45 |
| MgO | 1–4 |
| $Al_2O_3$ | 1–4 |
| FeO | 0.5–2 |
| $Na_2O$ | 0.5–2 |
| $K_2O$ | 0.5–2 |
| $CaF_2$ | 1–4 | and of 35 to 20% by weight of a fused flux having the following composition in percent by weight:

| | Percent |
|---|---|
| $SiO_2$ | 38–45 |
| MnO | 29–40 |
| $CaF_2$ | 4–10 |
| CaO | 5–15 |
| MgO | 0.5–4 |
| $Al_2O_3$ | 3–6 |
| FeO | 0.5–2 |
| $Na_2O$ | 0.5–2 |
| $K_2O$ | 0.5–2 |

4. A process of claim 1 which comprises protecting the weld by a flux, said flux and said loose granular material consisting of a mixture of 65 to 80% by weight of a flux having the following composition in percent by weight:

| | Percent |
|---|---|
| $SiO_2$ | 40–70 |
| CaO | 55–65 |
| MgO | 1–4 |
| $Al_2O_3$ | 1–4 |
| FeO | 0.5–2 |
| $Na_2O$ | 0.5–2 |
| $K_2O$ | 0.5–2 |
| $CaF_2$ | 1–4 | and of 35 to 20% by weight of a fused flux having the following composition in percent by weight:

| | Percent |
|---|---|
| $SiO_2$ | 38–45 |
| MnO | 29–40 |
| $CaF_2$ | 4–10 |
| CaO | 5–15 |
| MgO | 0.5–4 |
| $Al_2O_3$ | 3–6 |
| FeO | 0.5–2 |
| $Na_2O$ | 0.5–2 |
| $K_2O$ | 0.5–2 |

5. A process of claim 1, which comprises resiliently urging said refractory material toward the plates by an elastic compressible felt of fibers of refractory material.

6. A process of claim 1, which comprises urging the refractory particles upward by an elastic and compressible cushion which prior to placement is of relatively increased thickness and which diminishes in thickness by being pressed against the plates.

7. A process of claim 1, which comprises urging the refractory material upward by an elastic compressible cushion of a cotton-like felt made of fine particles consisting essentially of co-fused alumina and silica, the alumina being in higher proportion than the silica.

References Cited

UNITED STATES PATENTS

| | | | |
|---|---|---|---|
| 2,331,937 | 10/1943 | Schreiner | 219—160 X |
| 2,945,937 | 7/1960 | Tinsley et al. | 219—160 X |
| 3,078,193 | 2/1963 | Jackson. | |
| 3,177,340 | 4/1965 | Danhier | 219—146 |
| 3,221,135 | 11/1965 | Maier | 219—73 X |
| 3,307,014 | 2/1967 | Bada et al. | 219—137 |

FOREIGN PATENTS 798,949   7/1958   Great Britain.

JOSEPH V. TRUHE, Primary Examiner

J. G. SMITH, Assistant Examiner

U.S. Cl. X.R.

219—137

UNITED STATES PATENT OFFICE
CERTIFICATE OF CORRECTION

Patent No. 3,511,960     Dated May 12, 1970

Inventor(s)  Robert Jean De Haeck

It is certified that error appears in the above-identified patent and that said Letters Patent are hereby corrected as shown below:

In the heading to the printed specification, lines 7 to 8, "Original application June 30, 1969, Ser. No. 837,771. Divided and this application Jan. 31, 1967, Ser. No. 612,864" should read -- Filed Jan. 31, 1967, Ser. No. 612,864 --.

Signed and sealed this 23rd day of May 1972.

(SEAL)
Attest:

EDWARE M. FLETCHER, JR.
Attesting Officer

ROBERT GOTTSCHALK
Commissioner of Patents